Jan. 2, 1945.  B. J. LAZAN  2,366,342
MATERIALS TESTING APPARATUS
Filed April 25, 1942    2 Sheets-Sheet 2

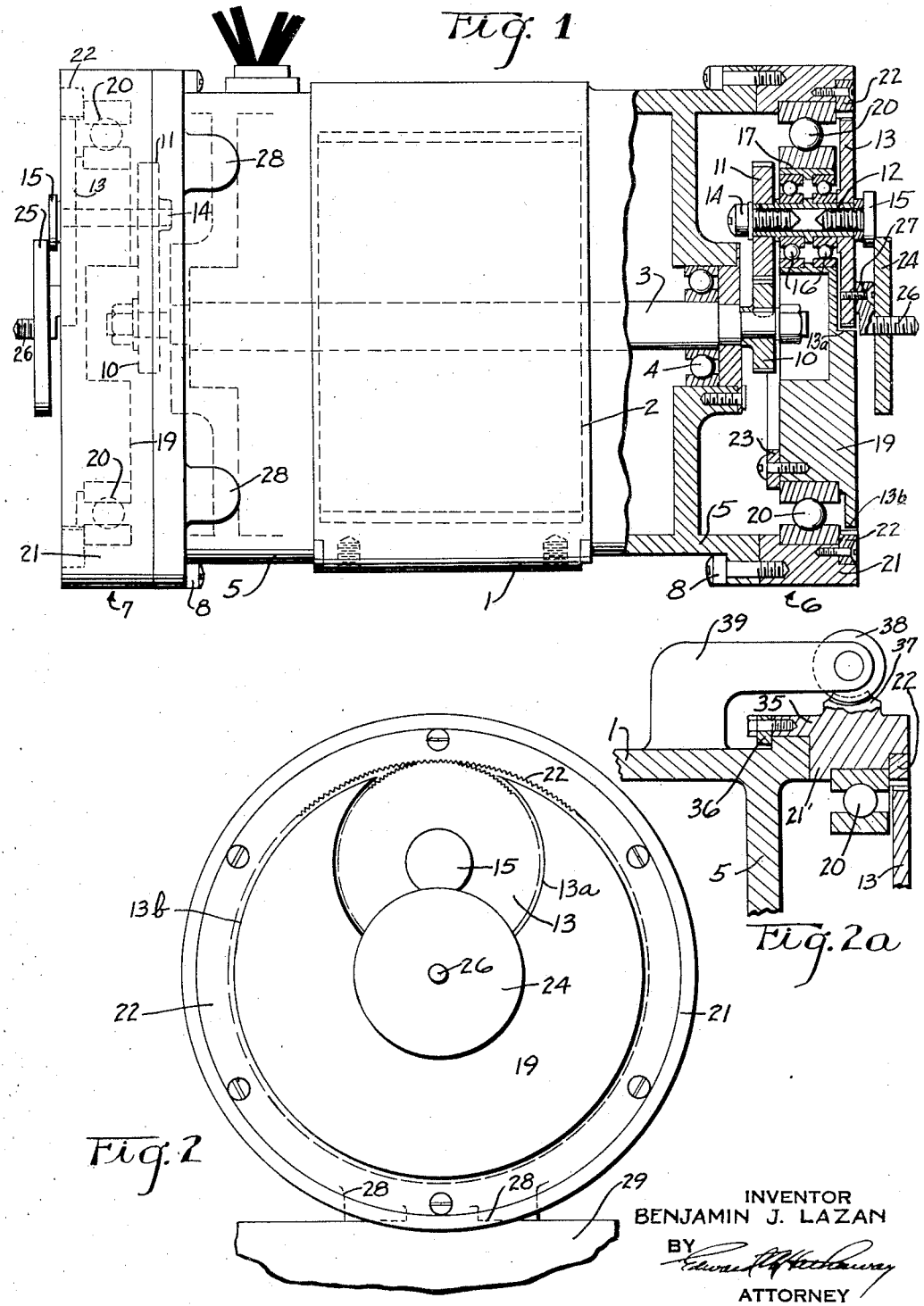

INVENTOR
BENJAMIN J. LAZAN
BY
ATTORNEY

Patented Jan. 2, 1945

2,366,342

UNITED STATES PATENT OFFICE 2,366,342

MATERIALS TESTING APPARATUS

Benjamin J. Lazan, State College, Pa.

Application April 25, 1942, Serial No. 440,440

3 Claims. (Cl. 74—61)

This invention relates generally to dynamic materials testing apparatus for imparting vibratory forces to a specimen or structure and relates more particularly to a dynamic testing device generally known as an oscillator.

Oscillators are particularly useful in setting up vibratory dynamic forces within life size structures, such as bridges, machines, railway cars and many other types of structures wherein it is desired to either study the effects of vibratory forces on such structures or where it is desired to simulate vibratory forces that may normally exist in such structures.

Various types of oscillators have heretofore been proposed and used but they have certain inherent limitations or objections such as being too costly, large or complicated for a given capacity or being limited in the extent or character of its alternating or pulsating vibratory forces.

For example, in certain types of oscillators two force producing masses are employed in such a manner that they balance out certain undesired forces generated by their rotation thereby producing a desired net vibrating force. The use of such a second force cancellation mass not only adds to the extent of the apparatus but also to its complications and size.

It is an object of my invention to provide an improved oscillator that is relatively simple and economical in construction, operation and maintenance and is compact and rugged.

A further object is to provide an improved oscillator in which the direction and frequency of dynamic forces may be varied even though a minimum number of revolving force producing weights are used.

Another object is to provide an improved oscillator in which the direction of vibratory forces may be easily and readily adjusted even during operation of the oscillator if desired.

In the specific aspects of my invention as disclosed herein, I accomplish the foregoing and other objects of my invention by providing what I term a hypocyclic oscillator so called because a hypocycloid curve is involved in its basic motion, this device being an inertia force type of mechanical oscillator. As a result of employing the hypocyclic principle, I am able to create a linear sinusoidal vibratory force by hypocyclic gear trains adapted to be so controlled and operated as to produce forces in alternating tension-compression or in torsion or bending. These forces may be in their pure (uncombined) form or combined in any relative magnitude.

Other objects and advantages will be more apparent to those skilled in the art from the following description of the accompanying drawings in which:

Fig. 1 is a plan view of my improved oscillator partly broken away to show details of construction at one end;

Fig. 2 is an end elevational view from the right hand side of Fig. 1;

Fig. 2a is a fragmentary section of means for adjusting the direction of the vibrating force;

Figure 3:
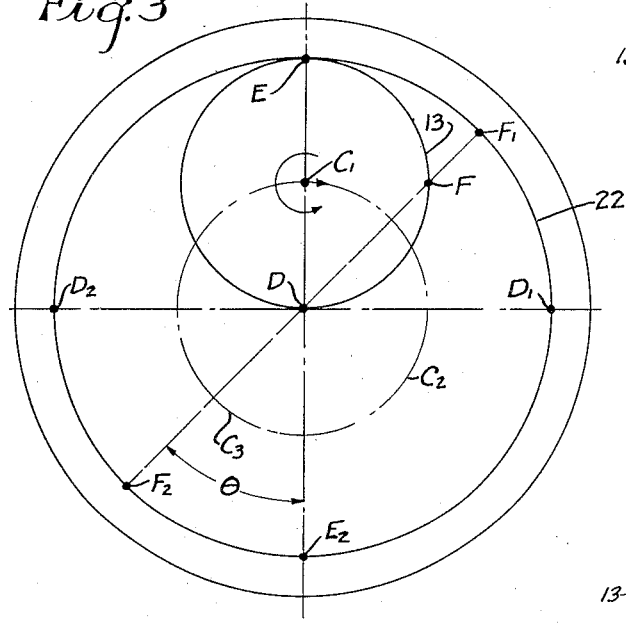
Fig. 3 is a diagrammatic outline illustrating the principle of my improved hypocyclic oscillator.

In the particular embodiment of the invention shown herein for purposes of illustration, I preferably employ an electric motor 1 and a usual rotor 2 mounted upon a shaft 3 which is journalled at its opposite ends in bearings 4. The motor and oscillator elements are symmetrical about a transverse central plane, the operating elements at the two ends being identical and hence the description for one end will suffice for the other and similar parts are identified by the same reference numbers. The motor casing is provided with preferably flanged axial continuations 5 upon which two identical hypocycloid ring assemblies generally indicated at 6 and 7 are removably connected by bolts 8. A motor shaft gear 10 drives a gear 11 which is keyed to a sleeve shaft 12. A second gear 13 is also keyed to shaft 12 and the two gears 11 and 13 are held on the shaft by a pair of studs 14 and 15 having screw threaded engagement with the interior of sleeve 12. The sleeve shaft 12 is journalled in bearings 16 preferably anti-friction bearings which are supported within a cylindrical recess 17 formed in a carrier disc 19, this disc in turn being journalled in a relatively large bearing 20 preferably an anti-friction bearing supported upon an annular ring 21. The gear 13 is set in a circular recess 13a, Fig. 2, formed in the face of disc 19, this recess being eccentrically located with respect to motor shaft 3 and intersecting the disc periphery 13b to provide a peripheral opening through which a small portion of gear 13 extends to mesh with a stationary gear 22. The outer and inner races of bearing 20 may be held in position by the internal gear 22 and by a segmental keeper ring 23. The gear 13 meshes with the stationary internal gear 22 thereby causing disc 19 and the various gears and elements associated therewith to be rotatably driven by the motor pinion 10 during rotation thereof. Mounted upon the gears 13 at the respective ends of the oscillator are two equal inertia masses 24 and 25, the masses 24 being preferably circular plates and supported so that their center is on an axial line with the pitch circle of pinion 13. Specifically, the masses are threadedly mounted on a stud 26 formed with a base bolted as at 27 to gear 13. The masses may be removed and other sizes placed thereon as may be necessary for any given test. The gears 13 are one half the diameter of internal gear 22 and because of this relationship as will be explained shortly the masses 24 and 25 have a linear sinusoidal motion across the diameter of disc 19, this motion always traversing the center of rotation of disc 19 and shaft 3 which are coaxial.

The motor casing is provided with suitable feet 28, Fig. 2, or other means for fastening the motor frame to a specimen or structure diagrammatically indicated at 29, although as later described the oscillator may be connected to the end of an axial specimen. Pinion 13 is driven by motor gear 10 and gear 11 so that gear 13 revolves within stationary gear 22 with the center of pinion 13 moving in a circular path.

*Operation.*—The principle of operation of my improved hypocyclic oscillator is more readily understood by referring to the diagram of Fig. 3. Clockwise rotation of disc 19 similarly rotates the center $C_1$ of pinion 13 although the pinion 13 rotates in a counterclockwise direction about its own center $C_1$. Under this condition of motion the absolute path traversed by a point on the pitch circle of pinion 13 will be a hypocycloid. However, if the diameter of internal gear 22 is twice the diameter of pinion 13 the hypocycloid degenerates into a straight line. For example, a point D on the pitch circle of pinion 13 will move along a horizontal straight line $DD_1DD_2D$ during one complete counterclockwise revolution of pinion 13. Similarly, a point E on the pitch circle of pinion 13 will move along a vertical straight line $EDE_2DE$. Another general point F on the pitch circle of pinion 13 will move along an inclined straight line $FF_1DF_2DF$ at some angle $\theta$ with the vertical. Furthermore, since the straight line motion of any general point F is the vector sum of two circular motions (or rotation of point F about the center $C_1$ of pinion 13 plus, vectorially, the revolution of pinion 13 about point D) the resulting motion is sinusoidal in nature. If a mass such as 24 or 25 is attached at any general pitch point F the resulting inertia force is sinusoidal and in the direction of motion $F_1F_2$. Herein lies the very important difference in principle from centrifugal force oscillators as heretofore built with two or more revolving weights 3 which were required for cancelling out certain forces in order to produce a net linear force. A second cancellation mass is not required in my oscillator and instead only a single mass is required to produce a linear force and this force, furthermore, is sinusoidal and in the desired direction of motion.

By rotating the ring assemblies 6 and 7 relative to the motor casing 1 as by removing bolts 8 and angularly shifting the annular rings the angle $\theta$, Fig. 3, of the path of motion of the masses may be adjusted, but in all cases the motion is linear and along the diameter of gear 22. In order to angularly adjust the ring assemblies 6 and 7 while the oscillator is in operation and without requiring the removal of such assemblies, I can employ any suitable gear mechanism such as diagrammatically shown in Fig. 2a. The ring 21' is enlarged so as to have an axial flange 35 journalled upon the motor casing flange 5 while a suitable keeper ring 36 engages the inner side of the motor casing flange. A segmental worm gear 37 may be formed on the periphery of flange 21' while a worm 38 is suitably journalled in a bracket 39 projecting outwardly from motor casing 1. Rotation of worm 38 either manually or by power, if desired, will angularly adjust the assembled rings each of which will be provided with a gear adjusting mechanism as just described. With this structure, it is possible to adjust either independently or simultaneously the directions of the vibrating forces produced by the two inertia masses 24 and 25. Step changes in the frequency of oscillation of masses 24 and 25, assuming that a constant speed motor is employed, may be accomplished by removing the ring assemblies 6 and 7 from the motor casing and replacing gears 10 and 11 by another pair of gears of any desired ratio.

Figure 6:
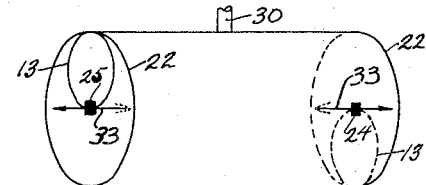
Figs. 4 to 9 diagrammatically illustrate the relation of the force producing weights for obtaining various types of pure and combined alternating forces or vibrations, the figures being in perspective.
Figure 7:
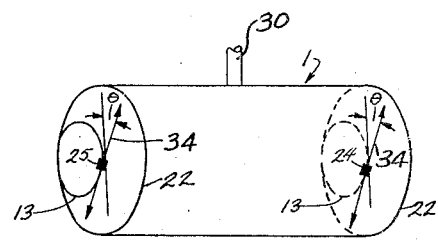
Figure 4:
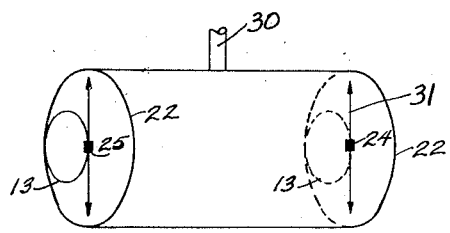
Figure 8:
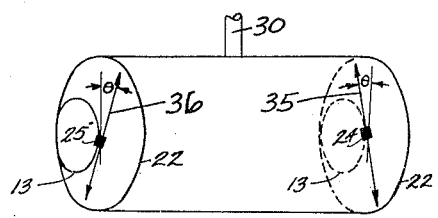
Figure 5:
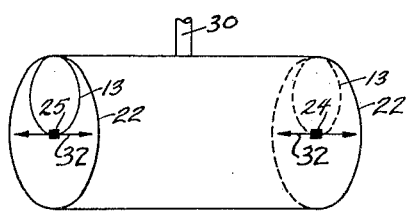
Figure 9:
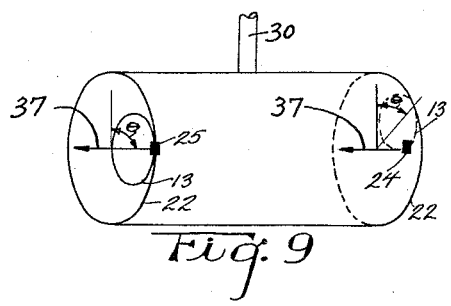

The ring assemblies may be adjusted to impart any of several types of alternating forces or vibrations to the test structure 29 when the motor casing is suitably bolted or otherwise secured thereto, although if the oscillator is connected to the lower end of a dependent specimen 30, the upper end of which is suitably anchored, then the vertical force extends longitudinally of the specimen. For the purpose of considering the character and type of forces adapted to be produced by my oscillator the direction of applied forces will be identified by their application to the specimen such as 30. The following types of vibratory forces are possible. (1) Pure longitudinal vibrations (alternating direct stress) Figs. 3 and 4. The ring assemblies 6 and 7 are angularly set so as to make the inertia masses 24 and 25 oscillate vertically in phase. The paths of motion of the two masses are as shown in Fig. 3 along the line $EE_2$ (lines 31, Fig. 4) and the masses move up and down together. Thus the two vertical sinusoidal forces produced by the two inertia masses are added together to induce alternating tension-compression forces in the specimen. (2) Lateral vibrations (alternating bending stress) Fig. 5. The rings 6 and 7 are angularly adjusted relative to the motor so that the inertia masses 24 and 25 move horizontally in phase, that is, back and forth together thereby producing alternating lateral forces as indicated by the lines 32. (3) Torsional vibrations (alternating shearing stress) Fig. 6. The rings 6 and 7 are angularly adjusted to produce lateral movement of the masses along lines 33 with the masses moving through a phase difference of 180°, that is, the masses respectively move in opposite directions at any given instant during their travel. Since the sinusoidal forces produced by the inertia masses are equal and parallel, but oppositely directed, an alternating torque about the specimen 30 is created. (4) Combined longitudinal and lateral vibrations (combined direct and bending dynamic stresses) Fig. 7. The ring assemblies 6 and 7 are angularly adjusted so that the paths of motion 34 of both masses makes an angle $\theta$ in the same direction from the vertical. Thus the alternating forces traveling up and down together have lateral and longitudinal components. The angle $\theta$-controls the relative magnitude of the dynamic stress. If $\theta$=zero degrees, then pure longitudinal forces occur in specimen 30. If $\theta$=90° then pure lateral forces result, and if $\theta$ is greater than 0° and less than 90° both longitudinal and lateral vibrations occur simultaneously. (5) Combined longitudinal and torsional vibrations (combined and direct torsional dynamic stress). As shown in Fig. 8, the ring 6 is placed so that path of motion 35 of mass 24 makes a clockwise (looking from the left) angle $\theta$ with the vertical and ring 7 is placed so that path of motion 36 of mass 25 makes a counterclockwise angle $\theta$ with the vertical. If $\theta=0°$ pure longitudinal vibrations occur and if $\theta=90°$ pure torsional vibrations result. However, if $0°<\theta<90°$ both vibrations occur simultaneously and the relative magnitude of each is determined by the angle $\theta$. (6) Combined lateral and torsional vibrations (combined bending and direct dynamic stress). As shown in Fig. 9, the angle between the vertical and the line joining the centers of gears 13 and 22 is defined as $\theta$ and $\theta'$ respectively for ring assemblies 6 and 7. The difference between these two angles, $\theta$ and $\theta'$ may be called the phase angle $\phi$. The ring assemblies are angularly positioned so that both inertia masses move in horizontal paths 37 but at a definite phase angle $\phi$. When $\phi=0°$ the oscillator produces pure alternating lateral forces and when $\phi=180°$ pure alternating torsional forces result. If, however, $0°<\phi<180°$ a combination of torsional and lateral forces are produced and the value of $\phi$, which may be regulated, controls the relative magnitude of the two components of the combined dynamic stress. (7) Combined lateral, longitudinal, and torsional. By using unequal masses 24 and 25, it is possible to produce all three dynamic forces combined in any relative magnitude.

Thus the hypocyclic oscillator is capable of producing the three common types of simple vibrations or any combination thereof in any relative magnitude. It therefore can simulate most types of vibrations met in actual practice, both in the simple and combined form. This enables the determination of empirical as well as basic data.

To regulate the magnitude of the force induced by this oscillator any one or several of a 1—2—4—8 geometric series of masses similar to 24 may be screwed in place. As a specific illustration of the capacity and compactness of my improved oscillator, when a 25 pound, ⅛ horsepower, 1800 revolutions per minute synchronous motor, weighing about 40 pounds, is used, it can produce forces exceeding ±200 pounds (or a torque of ±900 pound-inches). However, this force capacity may be greatly increased with small change in size and weight of the oscillator by using for example larger bearings in the design.

From the foregoing disclosure, it is seen that I have provided a very simple and compact oscillator in which each inertia mechanism employs only a single moving mass without need for any compensating masses to balance out undesired forces as is commonly done in prior art devices. My improved oscillator also has maximum flexibility of operation and directional control of the vibratory force thus being conducive to a wide range of applications.

It will of course be understood that various changes in details of construction and arrangement of parts may be made by those skilled in the art without departing from the spirit of the invention as set forth in the appended claims.

I claim:

1. An oscillator for imparting a predetermined vibration to a test member comprising, in combination, a motor having a casing, hypocycloid gearing disposed at each end of said casing to be driven by the motor, and inertia force producing masses supported by the hypocycloid gears at the respective ends of said motor casing for moving said masses along straight lines to produce individual vibratory forces acting solely in the direction of their respective straight lines whereby a net vibratory force results from the combined movement of said masses.

2. An oscillator for imparting a predetermined vibration to a test member comprising, in combination, a motor having a casing, hypocycloid gearing disposed at each end of said casing to be driven by the motor, and inertia force producing masses supported by the hypocycloid gears at the respective ends of said motor casing for producing a net vibratory force resulting from the combined movement of said masses, the gearing at each end of said motor having an internal gear and a hypocycloid gear equal to substantially one half the diameter of said internal gears and said masses being supported with their center of gravity substantially on the pitch line of said hypocycloid gears thereby reciprocating said masses in substantially straight lines for producing individual forces acting solely in the direction of their respective straight lines while their combined action produces said net force.

3. An oscillator for imparting a predetermined vibration to a test member comprising, in combination, a motor having a casing, hypocycloid gearing disposed at each end of said casing to be driven by the motor, inertia force producing masses supported by the hypocycloid gears at the respective ends of said motor casing for producing a net vibratory force resulting from the combined movement of said masses, the gearing at each end of said motor having an internal gear and a hypocycloid gear equal to substantially one half the diameter of said internal gears and said masses being supported with their center of gravity substantially on the pitch line of said hypocycloid gears thereby reciprocating said masses in substantially straight lines, and means for independently angularly adjusting said cycloid gears so as to change the direction in which said masses reciprocate.

BENJAMIN J. LAZAN.